(12) United States Patent
Sugiyama et al.

(10) Patent No.: US 6,583,433 B2
(45) Date of Patent: Jun. 24, 2003

(54) RANGE FINDER STRUCTURE ALLOWING EASIER FILLING OF THE TRANSPARENT FILLER

(75) Inventors: Osamu Sugiyama, Nagano (JP); Toshio Yamamoto, Nagano (JP); Akio Izumi, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/004,269

(22) Filed: Oct. 24, 2001

(65) Prior Publication Data

US 2002/0084432 A1 Jul. 4, 2002

(30) Foreign Application Priority Data

Oct. 27, 2000 (JP) ........................................ 2000-327922

(51) Int. Cl.$^7$ ............................. G01N 21/86; G01V 8/00
(52) U.S. Cl. ................ 250/559.38; 250/216; 356/3.13; 396/114; 359/819
(58) Field of Search ............................ 250/216, 559.38; 356/3.13, 3.14, 3.15, 3.16, 121, 122, 123; 396/111, 114, 89; 359/819

(56) References Cited

U.S. PATENT DOCUMENTS 5,166,533 A * 11/1992 Kajiwara ................ 250/559.05
5,225,689 A * 7/1993 Buckle et al. ............ 250/559.4
5,715,043 A * 2/1998 Hasegawa et al. ......... 356/3.14
6,046,795 A * 4/2000 Sugiyama et al. ......... 356/3.14
6,308,015 B1 * 10/2001 Matsumoto ................ 396/106
6,337,736 B1 * 1/2002 Sugiyama et al. ......... 356/3.14

FOREIGN PATENT DOCUMENTS

JP 61-214566 A 9/1986

* cited by examiner

*Primary Examiner*—Stephone B. Allen
*Assistant Examiner*—Eric J Spears
(74) *Attorney, Agent, or Firm*—Rossi & Associates

(57) ABSTRACT

A range finder includes an improved module structure, that facilitates injecting a transparent filler uniformly into the entire light guide spaces neither leaving any unfilled region nor impairing the characteristics thereof. A channel of flow (or U-groove) is formed across a partition wall, connecting light guide spaces arranged side by side. This feature allows smooth flow of transparent filler into the range finder module without an unfilled region and consequently no overflow of the transparent filler onto outer wall of the plastic module and onto terminal portion of the lead frame. Another feature of this invention is the presence of shield walls along the channel of flow protruding from the side walls of the channel of flow in an inter-digitated fashion, to prevent the stray light from one light guide space entering the other light guide space through the channel of flow.

5 Claims, 7 Drawing Sheets

RANGE FINDER STRUCTURE ALLOWING EASIER FILLING OF THE TRANSPARENT FILLER

BACKGROUND OF THE INVENTION

1. Field of the Invention

The present invention relates to a range finder mounted on an automatic focusing camera. Specifically, the present invention relates to a module structure of the range finder.

2. Description of Related Art

First, a conventional range finder based on the principle of triangulation using the external light mounted on an auto-focusing camera is explained. FIG. 5 is a block diagram of a conventional range finder based on the principle of triangulation using the external light. Referring now to FIG. 5, the conventional range finder includes an image forming optical system including a pair of range finding lenses 1L, 1R and a semiconductor optical sensor chip 5 including photo-sensor arrays 5L, 5R, quantizer circuits 51L, 51R and a logic circuit 52 integrated into the semiconductor optical sensor chip 5. The photo-sensor arrays 5L and 5R convert the images of an object (hereinafter referred to as the "object images") to electrical signals. The quantizer circuits 51L and 51R convert the electrical signals outputted from the photo-sensor arrays 5L and 5R to digital signals, The logic circuit 52 calculates a range signal (or a distance signal) based on the digital signals outputted from the photo-sensor arrays 5L and 5R. The images of an object T (hereinafter referred to as the "object images") are formed on the photo-sensor arrays 5L and 5R through the range finding lenses 1L and 1R arranged side by side such that the centers of the range finding lenses 1L and 1R are spaced apart for a base line length B.

The distance d from the range finding lenses 1L, 1R to the object T (hereinafter referred to as the "object distance") is calculated by the following formula (1) based on the principle of triangulation.

$$d = B \times fe / (X1 + X2) = B \times fe / X \quad (1)$$

Here, fe is the distance from the range finding lenses 1L and 1R to the sensor arrays 5L and 5R, that is equal to the focal length of the range finding lenses 1L and 1R. The X1 and X2 are the differences between the positions of the object images on the photo-sensor arrays 5L and 5R when the object T is at a finite distance and the positions of the object images on the photo-sensor arrays 5L and 5R when the object T is at the point of infinity distance. The length X (=X1+X2) is the relative shift length of the object images on the photo-sensor arrays 5L and 5R.

The structure of the conventional range finder integrated into a module mounted on a camera is shown in FIGS. 6(a) through 8. FIG. 6(a) is a top plan view of a conventional range finder module. FIG. 6(b) is a side plan view of the conventional range finder module. FIG. 6(c) is another side plan view of the conventional range finder module. FIG. 7 is an exploded perspective view of the conventional range finder module including the optical lens mount, the aperture mount and the sensor stage shown in FIGS. 6(b) and FIG. 6(c). FIG. 8 is a cross sectional view of the range finder module shown in FIGS. 6(a) through 6(c). Referring now to these figures, the range finder module includes an optical lens mount 1 including the pair of the range finding lenses 1L and 1R arranged side by side, an aperture mount 2 for guiding the rays impinging onto the range finding lenses 1L and 1R to the photo-sensor arrays 5L and 5R on the semiconductor sensor chip 5, and a sensor stage 3 including the semiconductor sensor chip 5 mounted thereon. The optical lens mount 1, the aperture mount 2 and the sensor stage 3 are made of plastic. These constituents are piled up and bonded at the bonding planes thereof such that they are combined into a unit.

The range finding lenses 1L and 1R are integrated into the optical lens mount 1 such that the range finding lenses 1L and 1R are positioned side by side. A pair of light guide spaces 2a are formed in the aperture mount 2 corresponding to the respective range finding lenses 1L and 1R. Aperture holes 2L and 2R, that determine the amount of the light impinging onto the semiconductor optical sensor chip 5, are formed in the respective light guide spaces 2a. The sensor stage 3 includes a lead frame 4 formed by insertion molding into the sensor stage 3. Bonding wires connect the lead frame 4 and the semiconductor optical sensor chip 5 mounted at a predetermined position on the sensor stage 3.

The space inside the range finder module is filled with a transparent filler 6 such as a transparent silicone gel, that seals the semiconductor optical sensor chip 5 and the vicinity thereof to prevent the pad of the sensor chip 5 and the bonding wires from being deteriorated by temperature change, moisture, thermal stress, foreign substances and such causes. FIG. 9 is a cross sectional view for explaining the method of injecting a transparent filler into the range finder module of FIG. 8. Referring now to FIG. 9, the back surface of the sensor stage 3 is open to provide an injection port for injecting the transparent filler and for absorbing thermal expansion and thermal contraction of the transparent filler. First, the range finder module of FIG. 8 is set upside down. A syringe containing a fluid transparent filler is set at the injection port in the open back surface of the sensor stage 3. The transparent filler 6 is injected into the range finder module through the gap between semiconductor optical sensor chip 5 and the sensor stage 3. The transparent filler 6, that has flowed into the inside space surrounded by the optical lens mount 1, the aperture mount 2 and the sensor stage 3, fills the inside space. Further, the transparent filler 6 covers the semiconductor optical sensor chip 5. Then, a heat treatment is conducted to cure the transparent filler 6. The amount of the transparent filler 6 is controlled such that the transparent filler 6 is injected up to the level of the open back surface of the sensor stage 3 at the end of the transparent filler injection.

The transparent filler injection into the conventional range finder module as described above causes the following problems. When injection speed variation and injection amount variation are caused during injecting the transparent filler 6, the light guide spaces 2a in the aperture mount 2 are not completely filled with the transparent filler 6 sometimes. When the light guide spaces 2a are not filled with the transparent filler 6 completely, voids are caused by heat treatment in the field of view between lenses 1L, 1R and the optical sensor arrays 5L, 5R. As a result, the object images are not formed correctly on the photo-sensor arrays 5L and 5R.

The present inventors have found the causes for the voids in the transparent filler. As shown in FIG. 9, the transparent filler 6 is injected from one injection port. However, the inside space of the range finder module to be filled with the transparent filler 6 forks to the right light guide space and the left light guide space in the aperture mount 2. Since the front end of the aperture mount 2 is in contact with the optical lens mount 1 and since the light guide spaces 2a are separated from each other by a partition wall 2b as shown in FIG. 8, the light guide spaces 2a are shaped with respective pockets and the middle portions of the pocket-shaped light guide spaces 2a are narrowed by the aperture holes 2L and 2R.

During the transparent filler injection described in FIG. 9, the air in the spaces replaced by the transparent filler 6 may escape upward through the aperture holes as far as the transparent filler flows little by little into the space between the optical lens mount 1 and the aperture mount 2 through the aperture holes 2L and 2R. However, when the transparent filler flowing onto the aperture holes 2L and 2R closes the narrow aperture holes 2L and 2R while unfilled regions are still remaining in the space between the optical lens mount 1 and the aperture mount 2, the air in the unfilled regions has no way to escape and the air is enclosed in the regions below the aperture holes 2L and 2R. The enclosed air prevents the transparent filler 6 from being injected further and bubbles are caused in the transparent filler layer.

Since the transparent filler, injected from the injection port of the sensor stage 3, is distributed to the right and left light guide spaces 2a, imbalance is caused between the amount of the transparent filler flowing into the right light guide space and the amount of the transparent filler flowing into the left light guide space. When the surface of the transparent filler flowing into one of the light guide spaces reaches the level of the aperture hole in advance of the surface of the transparent filler flowing into the other light guide space, the transparent filler, that has flowed into that one light guide space may overflow to the other light guide space. The overflowing transparent filler closes the narrow aperture hole and causes an unfilled region or unfilled regions.

When an unfilled region or unfilled regions are caused, the transparent filler, of an amount corresponding to the volume of the unfilled region or the unfilled regions, leaks from the injection port of the sensor stage 3. The leaking transparent filler sticks to the outer wall of the plastic module and terminal portion of the lead frame 4 and impairs the external appearance of the range finder module. Accordingly, it would be desirable to provide a range finder that obviates the problems described above. It would be further desirable to provide a range finder having an improved module structure, that facilitates filling a transparent filler uniformly into the entire light guide spaces neither leaving any unfilled region nor impairing the characteristics thereof.

SUMMARY OF THE INVENTION

According to an aspect of the invention, there is provided a range finder including: an optical lens mount including a pair of range finding lenses arranged side by side; an aperture mount including a pair of light guide spaces, the light guide spaces being arranged side by side corresponding to the range finding lenses, a pair of aperture holes for limiting the rays through the range finding lenses, the aperture holes being arranged side by side corresponding to the range finding lenses, and a partition wall separating the light guide spaces; a sensor stage mounting a semiconductor sensor chip thereon, the semiconductor sensor chip measuring the distance between an object and the image of the object formed thereon through the range finding lenses; the optical lens mount, the aperture mount and the sensor stage being piled up and combined into a unit such that a module of the range finder is formed; a transparent filler filling the space inside the module of the range finder such that the semiconductor sensor chip is sealed; and the aperture mount including a channel of flow formed across the partition wall, the channel of flow connecting the light guide spaces arranged side by side. Advantageously, the channel of flow is a U-shaped groove (hereinafter referred to as a "U-groove") formed across the partition wall on the open end side of the aperture mount facing to the range finding lenses.

When a transparent filler is injected into the space in a range finder module from the injection port of the range finder module set upside down, the space in the range finder module is filled with the transparent filler completely without leaving any unfilled region. In detail, the transparent filler injected from the injection port is divided into two streams, that further flow into the light guide spaces arranged side by side. Due to the difference between the amounts of the transparent filler flowing into the light guide spaces, a difference is caused temporarily between the levels of the transparent filler surfaces in the light guide spaces. However, since the transparent filler flows through the channel of flow, connecting the light guide spaces to each other, from one of the light guide spaces to the other due to the gravitational force, levels of the transparent filler surfaces are equalized.

Therefore, the rising levels of the transparent filler surfaces in the light guide spaces are always equalized to each other. Thus, the transparent filler flows smoothly in the space inside the range finder module, never closes the aperture hole downward and fills the space inside the range finder module completely without leaving any unfilled region. Since the transparent filler surface rises uniformly around the semiconductor optical sensor chip, all the predetermined amount of the transparent filler is injected without causing any leakage from the injection port. Moreover, since the transparent filler is injected smoothly, the period of time necessary to inject the transparent filler is shortened.

Advantageously, the range finder further includes shield walls arranged in the channel of flow (or U-groove), the shield walls preventing a ray, that has entered the channel of flow (or U-groove) through one of the range finding lens, from entering the light guide space on the other side through the channel of flow (or U-groove). Advantageously, the shield walls includes one or more walls protruding from one of the side walls of the channel of flow (or U-groove) and one or more walls protruding at different locations along the channel of flow from the other side wall of the channel of flow (or U-groove), the side walls of the channel of flow facing opposite to each other. Advantageously, the range finder further includes a space between the shield walls and the optical lens mount.

A part of the rays, having high incident angles and refracted by one of the range finding lenses, propagates straight through the light guide space or is reflected by the wall of the light guide space to the channel of flow (or U-groove). However the ray propagating straight through the light guide space or reflected by the wall of the light guide space to the channel of flow (or U-groove) is interrupted by the shield walls arranged in the channel of flow (or U-groove), prevented from further entering the adjacent light guide space, reflected or absorbed by the shield walls and finally extinguished. If the shield walls were not disposed, a part of the rays, that have entered the light guide space, further enters the adjacent light guide space through the channel of flow (or U-groove), causing stray light. The stray light prevents object images from being formed correctly on the photo-sensor arrays, causing low accuracy of range finding. The shield walls prevent stray light from causing errors in range finding.

By positioning the shield walls such that some walls protruding from a side wall[s] of the channel of flow (or U-groove) and the other walls protruding from the other side wall of the channel of flow (or U-groove), the channel of flow (or U-groove) shaped with a labyrinth connects the light guide spaces with each other. The channel of flow (or U-groove) facilitates injecting the transparent filler smoothly into the range finder module.

DETAILED DESCRIPTION OF THE PREFERRED EMBODIMENTS OF THE INVENTION

Figure 1:
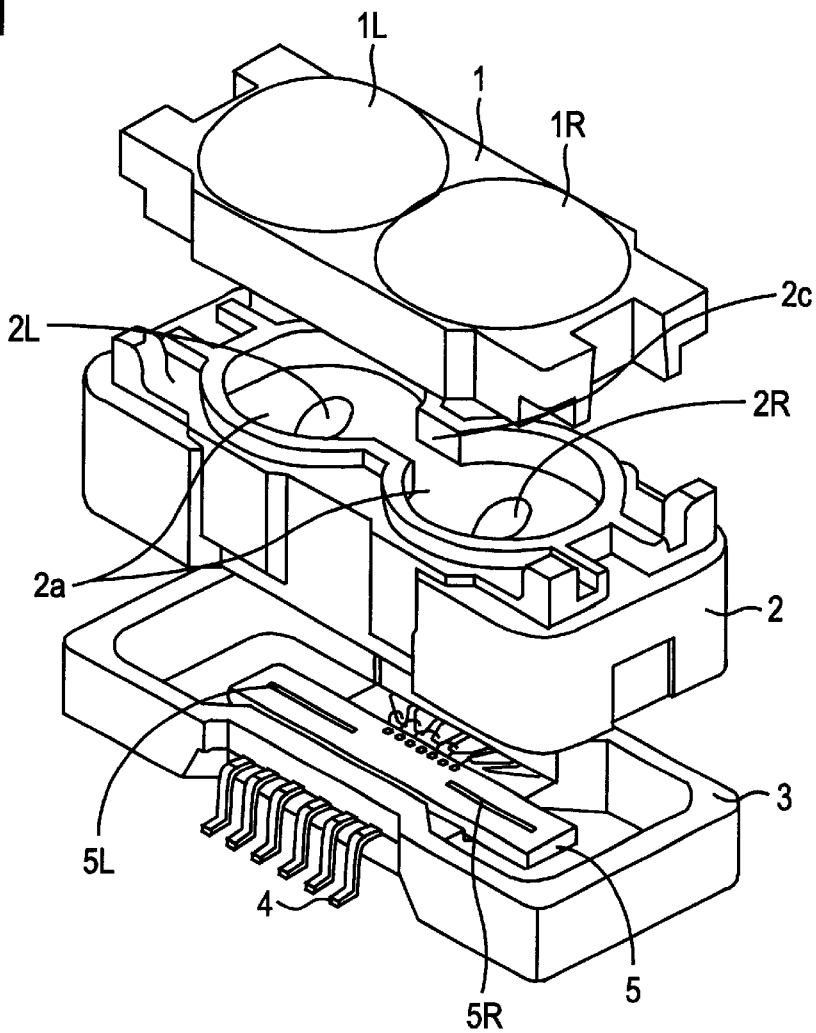
FIG. 1 is an exploded perspective view of a range finder module according to a first embodiment of the invention.

Now the invention will be explained hereinafter with reference to the accompanying drawing figures which illustrate the preferred embodiments of the invention. In the drawings, which illustrate the preferred embodiments of the invention, the same reference numerals as used in FIGS. 6(a) through 8 are used to designate the same constituent elements and their explanations are omitted for the sake of simplicity.

First Embodiment

Figure 2:
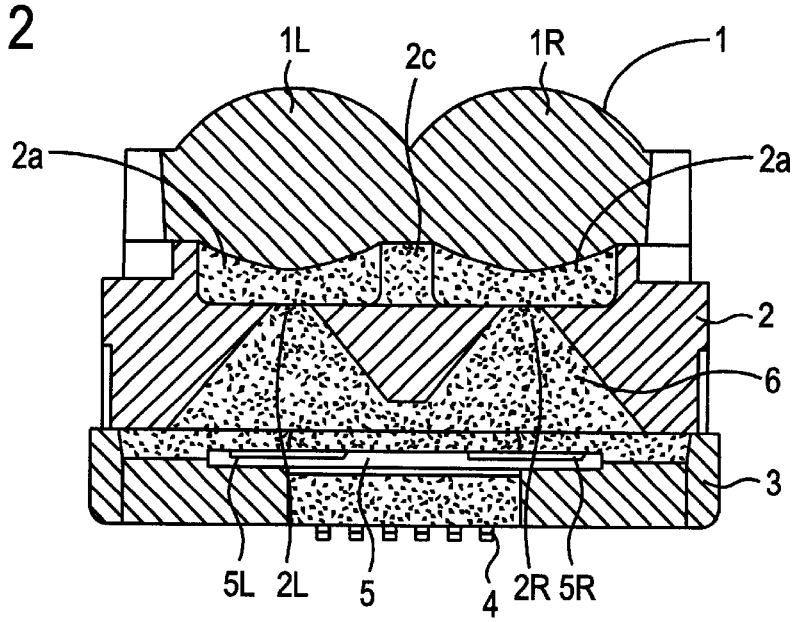
FIG. 2 is a cross-sectional view of the range finder module of FIG. 1.

FIG. 1 is an exploded perspective view of a range finder module according to a first embodiment of the invention. FIG. 2 is a cross sectional view of the range finder module of FIG. 1. Referring now to FIGS. 1 and 2, the fundamental configuration of the module is the same with the conventional one shown in FIGS. 6(a) through 8. However, a channel of flow 2c connecting light guide spaces 2a with each other is formed in an aperture mount 2 of the range finder module according to the first embodiment of the invention. The channel of flow 2c is a U-groove formed in a partition wall 2b separating the light guide spaces 2a and facing to an optical lens mount 1. The depth of the U-groove 2c is set such that the bottom of the U-groove 2c is at the level of the openings of the aperture holes 2L and 2R formed from the end face of the aperture mount 2 to the light guide spaces 2a.

Figure 9:
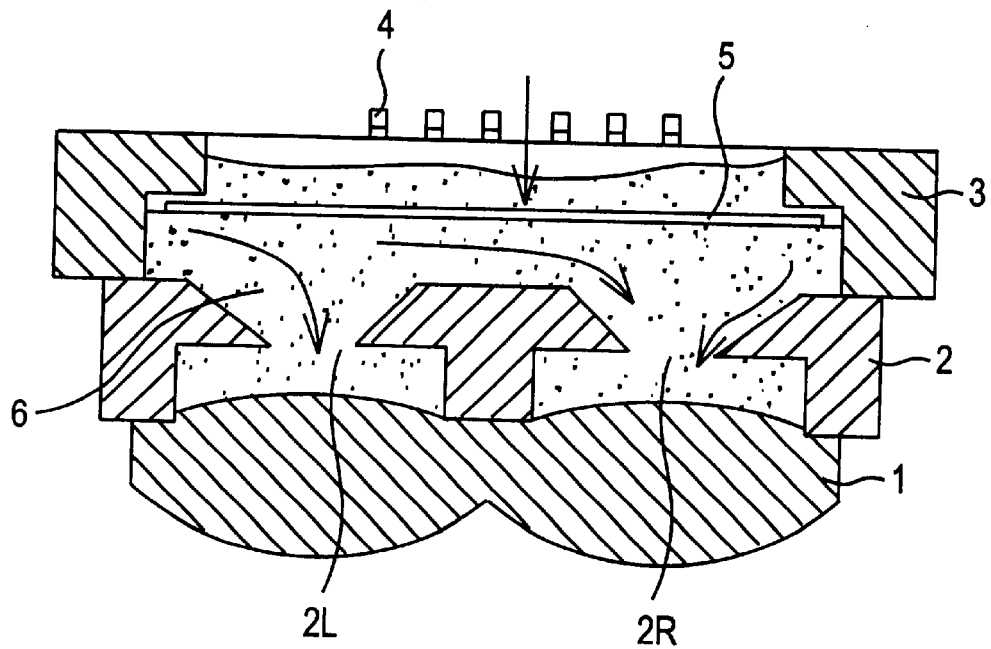
FIG. 9 is a cross-sectional view for explaining the method of injecting a liquid filler into the range finder module of FIG. 8.

For filling the space inside the range finder module, formed by piling up the optical lens mount 1, the aperture mount 2 and a sensor stage 3 and by bonding these constituents with each other, with a transparent filler, the module is set upside down as shown in FIG. 9. A syringe containing a fluid transparent filler is set at an injection port in the open back surface of the sensor stage 3 and a predetermined amount of the transparent filler is injected at a predetermined speed.

The transparent filler, injected into the aperture mount 2 and divided into two streams, flows into the light guide spaces 2a. The transparent filler flows down through the light guide spaces 2a and reaches the surface of the optical lens mount 1. As described above, the U-groove 2c formed in the end portion of the aperture mount 2 facing to the optical lens mount 1 connects the light guide spaces 2a with each other. Therefore, the transparent filler, that has flowed through the aperture holes 2L and 2R and is staying above the optical lens mount 1, fills the U-groove 2c such that the surfaces of the transparent filler in the light guide spaces 2a rise keeping balance with each other. The rising surfaces of the transparent filler in the light guide spaces 2a reach the level of the aperture holes 2L and 2R almost at the same time.

Thus, an unfilled region or unfilled regions never remain in the light guide spaces 2a of the aperture mount 2, and voids caused due to incomplete filling of the transparent filler are prevented from occurring in the transparent filler and the transparent filler is injected into the entire space inside the range finder module. After the space inside the sensor stage 3 is completely filled with the transparent filler, the transparent filler covers bonding wires and semiconductor sensor chip 5 in the sensor stage 3. Once the predetermined amount of the transparent filler has been injected, the transparent filler fills the injection port formed in the back surface of the sensor stage.

Second Embodiment

Figure 3A:
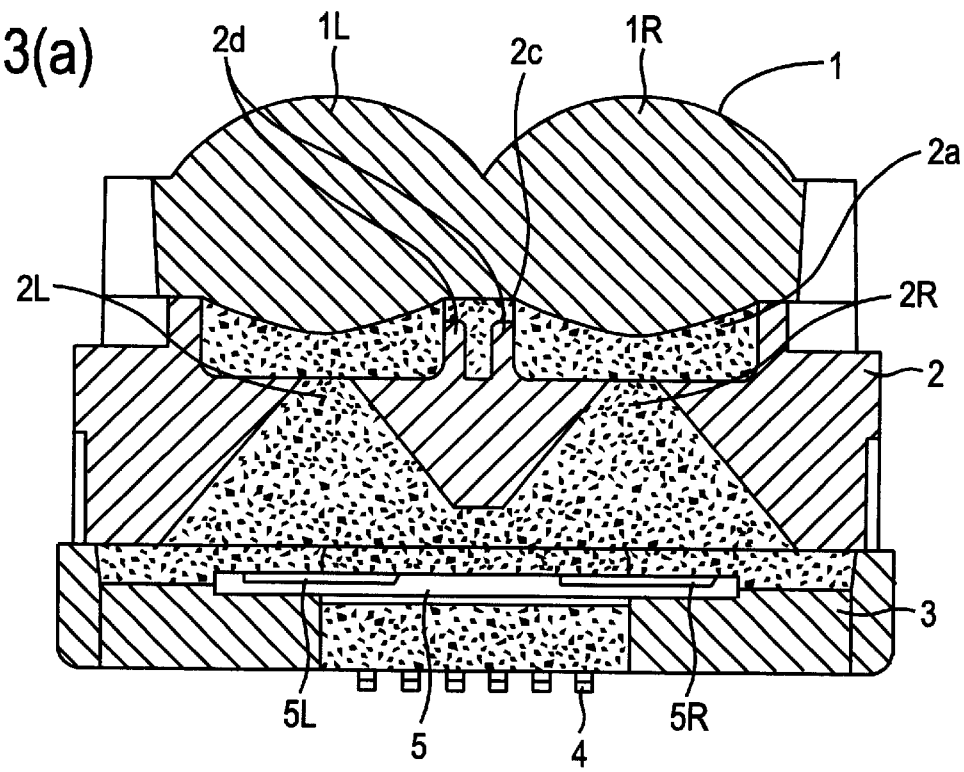
FIG. 3(a) is a cross-sectional view of a range finder module according to a second embodiment of the invention.
Figure 3B:
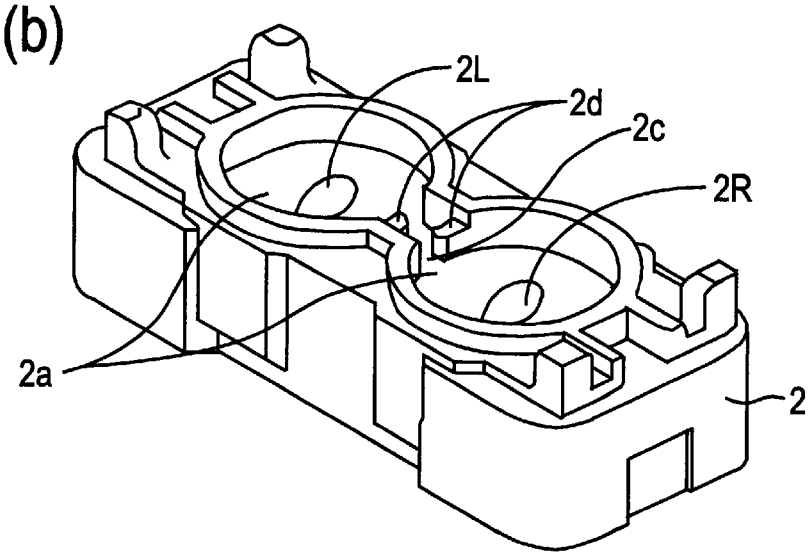
FIG. 3(b) is a perspective view of the aperture mount of the range finder module of FIG. 3(a).
Figure 3C:
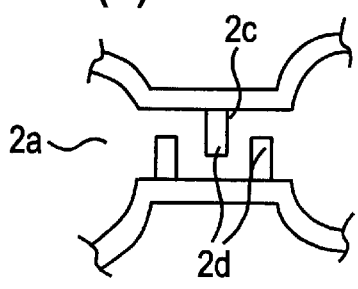
FIG. 3(c) is a cross-sectional view showing a modified arrangement of the shield walls different from that shown in FIG. 3(b).
Figure 3D:
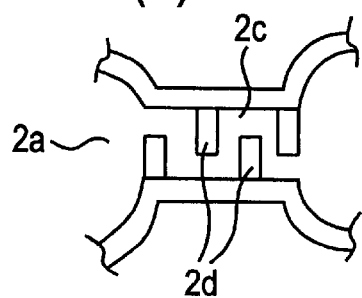
FIG. 3(d) is another cross-sectional view showing another modified arrangement of the shield walls different from those shown in FIGS. 3(b) and 3(c).
Figure 4A:
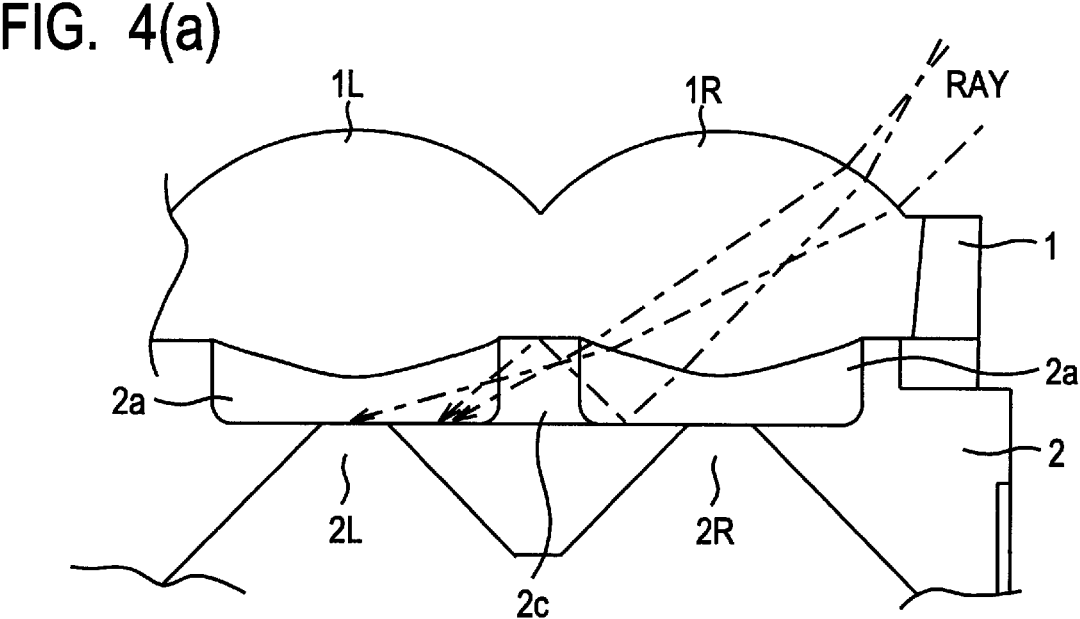
FIG. 4(a) is a cross-sectional view showing the incident light paths in the range finder module, that does not include any shield wall.
Figure 4B:
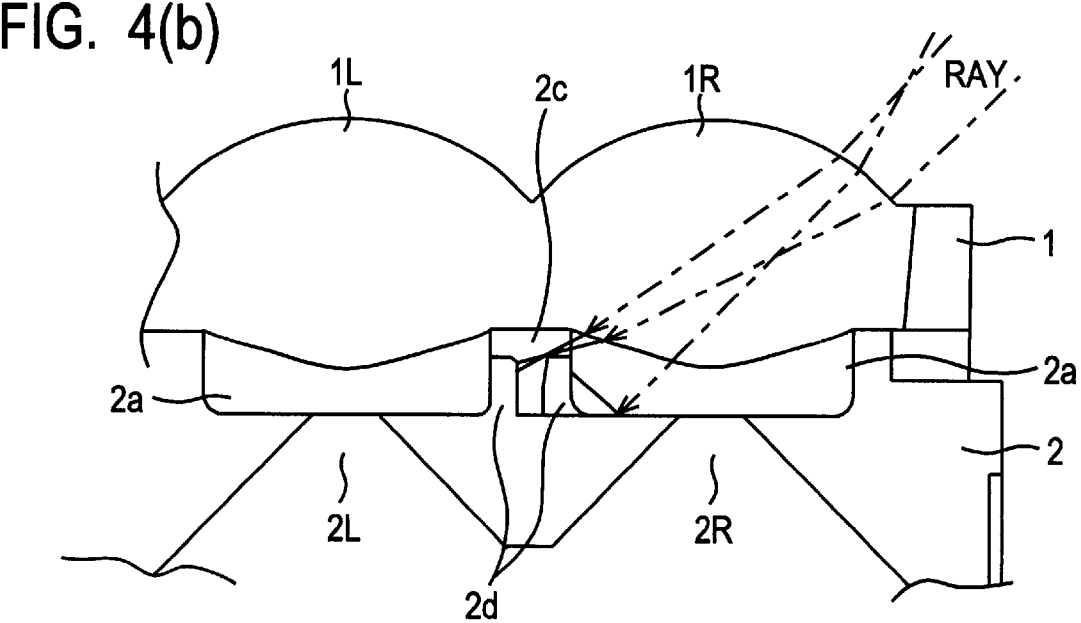
FIG. 4(b) is a cross-sectional view showing the incident light paths in the range finder module, that includes shield walls.
Figure 5:
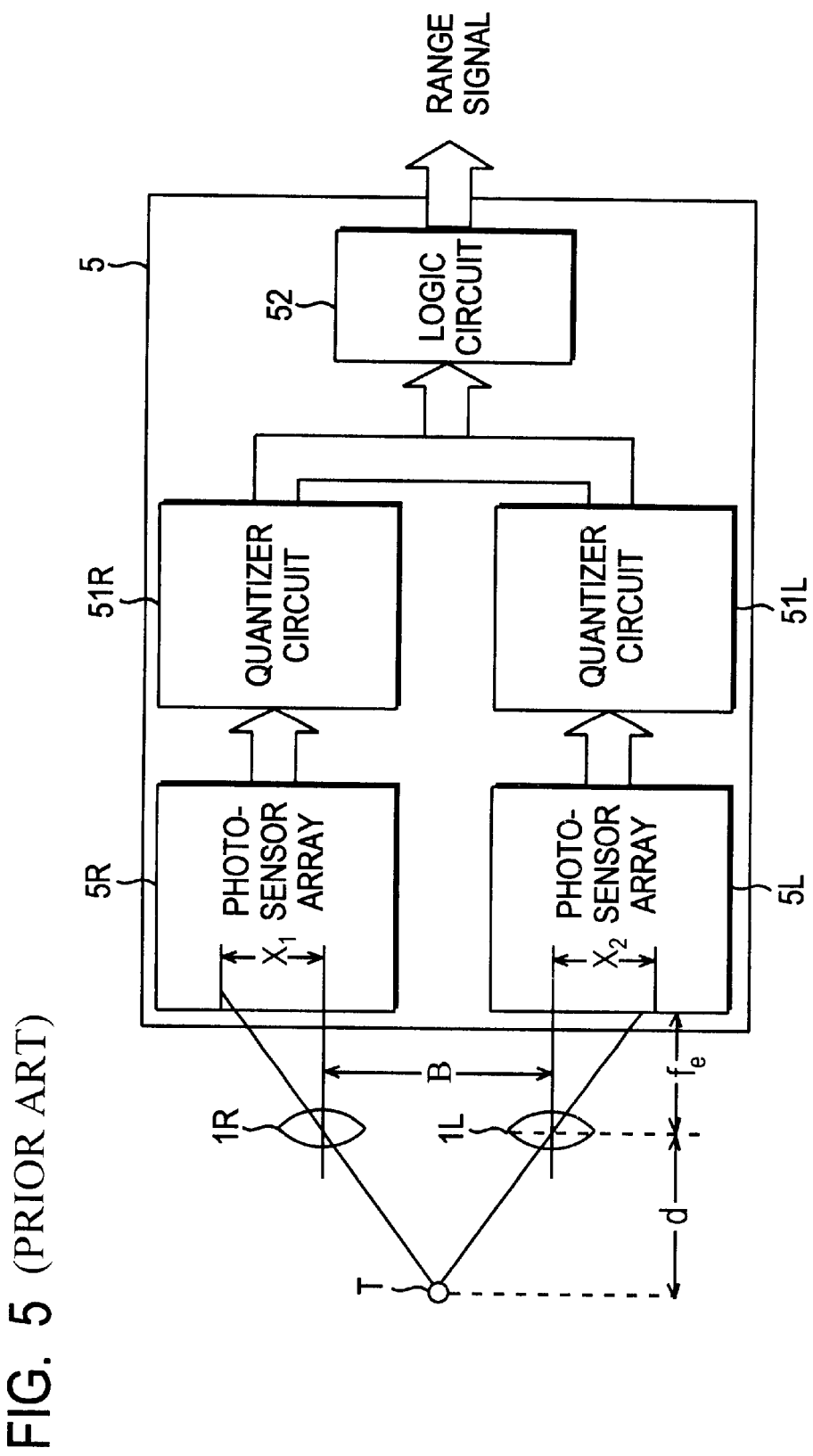
FIG. 5 is a block diagram of a conventional range finder based on the principle of triangulation using the external light.
Figure 6A:
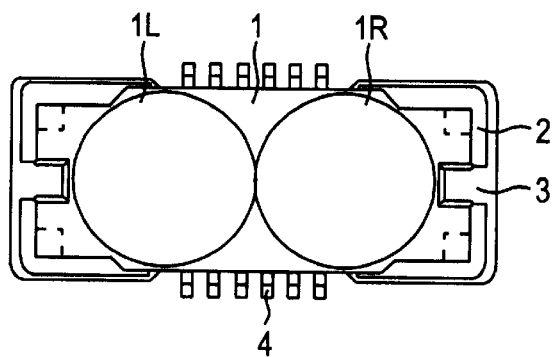
FIG. 6(a) is a top plan view of a conventional range finder module.
Figure 6B:
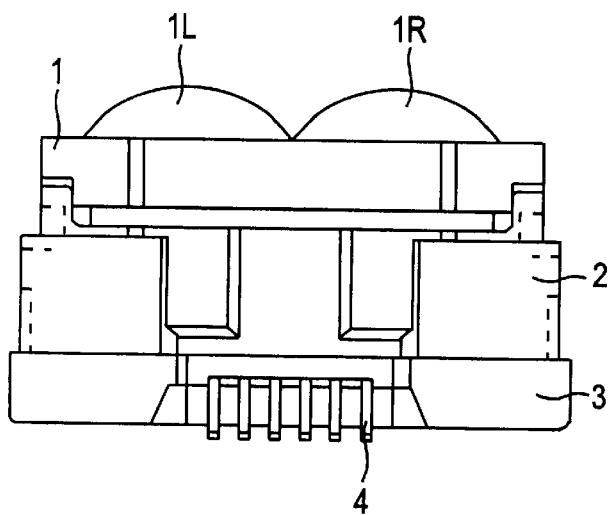
FIG. 6(b) is a side plan view of the conventional range finder module.
Figure 6C:
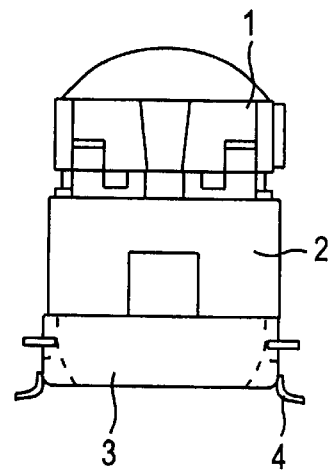
FIG. 6(c) is another side plan view of the conventional range finder module.
Figure 7:
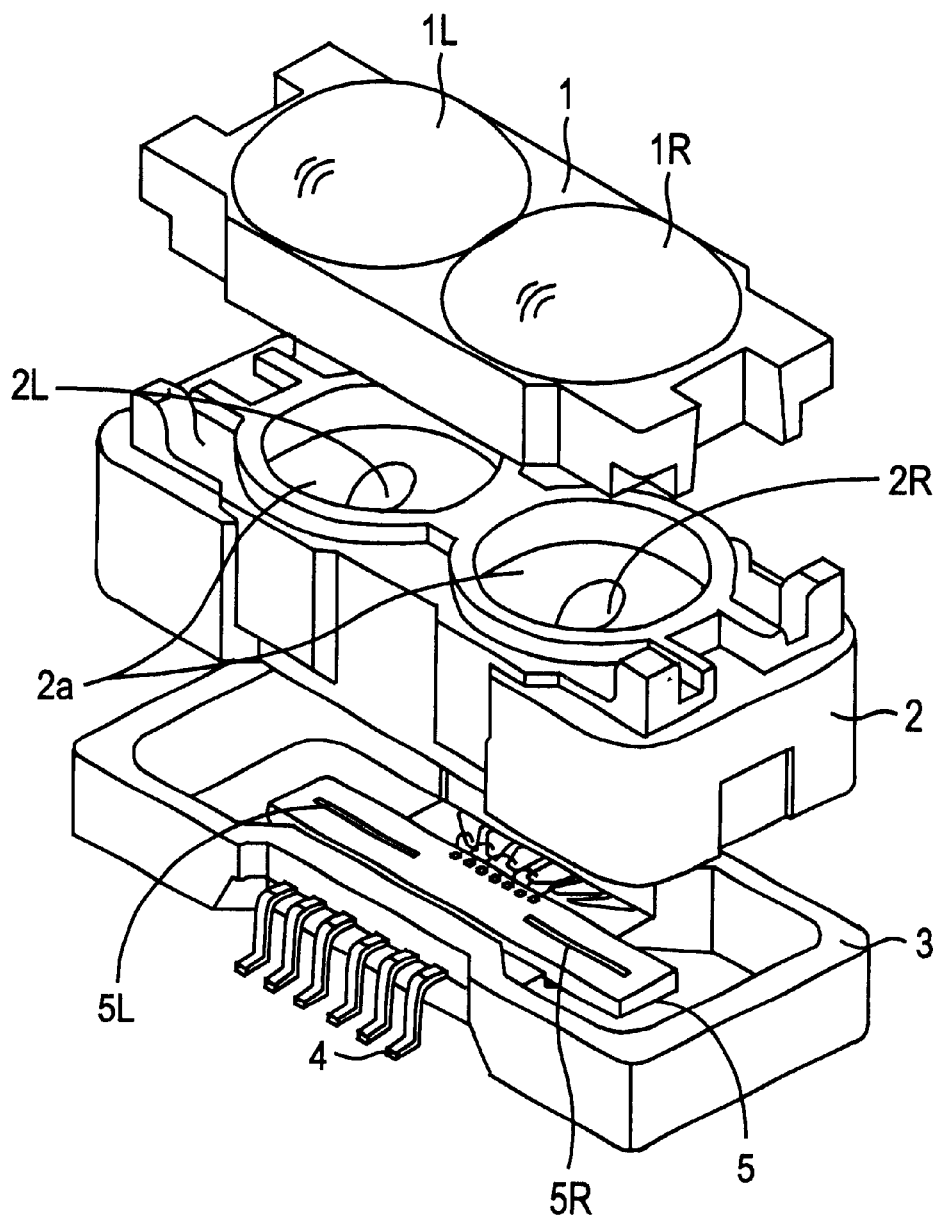
FIG. 7 is an exploded perspective view of the conventional range finder module including the optical lens mount, the aperture mount and the sensor stage shown in FIGS. 6(b) and FIG. 6(c).
Figure 8:
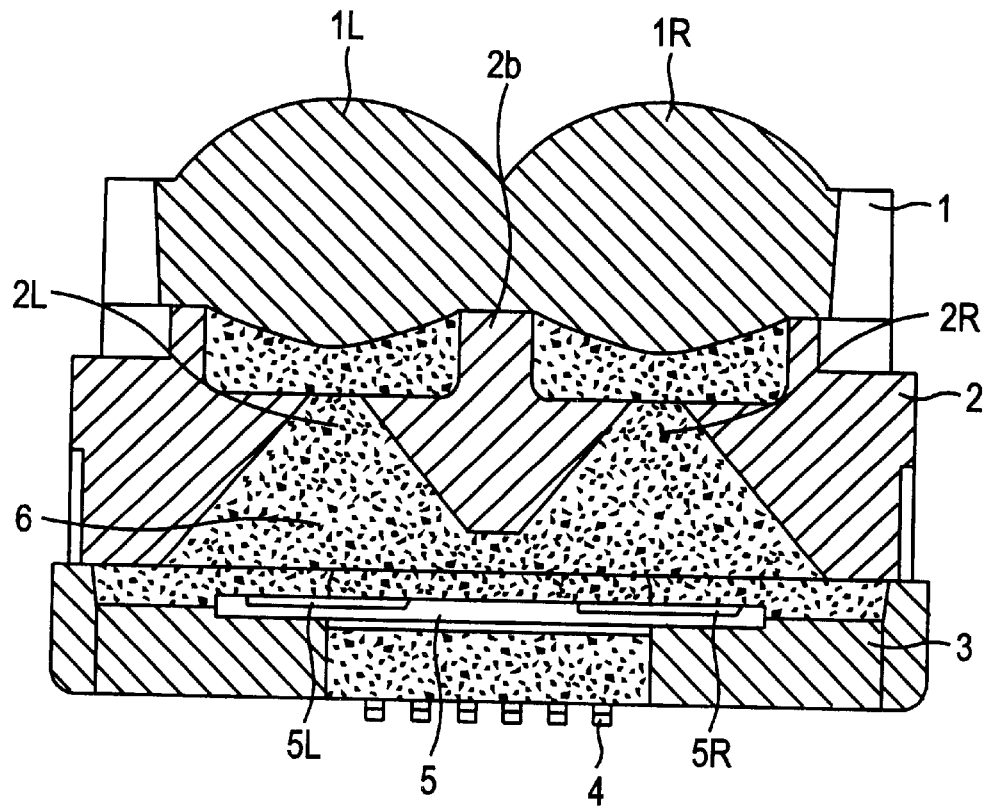
FIG. 8 is a cross-sectional view of the range finder module shown in FIGS. 6(a) through 6(c).

FIG. 3(a) is a cross-sectional view of a range finder module according to a second embodiment of the invention. FIG. 3(b) is a perspective view of the aperture mount of the range finder module of FIG. 3(a). FIG. 3(c) is a cross sectional view showing a modified arrangement of the shield walls different from that shown in FIG. 3(b). FIG. 3(d) is another cross-sectional view showing another modified arrangement of the shield walls different from those shown in FIGS. 3(b) and 3(c). FIG. 4(a) is a cross sectional view showing the incident light paths in the range finder module, that does not include any shield wall. FIG. 4(b) is a cross sectional view showing the incident light paths in the range finder module, that includes shield walls. Referring now to FIGS. 3(a) through 3(d), the range finder module according to the second embodiment further includes shield walls 2d in a U-groove 2c of an aperture mount 2. One shield wall is protruding from one side wall of the U-groove 2c and another shield wall from another side wall of the U-groove 2c such that the U-groove 2c forms a labyrinth between light guide spaces 2a. The height of the shield walls 2d is a little bit shorter than the depth of the U-groove 2c such that the shield walls 2d do not touch the range finding lens surface when the aperture mount 2 and the optical lens mount 1 are combined with each other. This structure does not affect adversely the bonding of the the optical lens mount 1 and the aperture mount 2 with each other.

The structure described above works in the same manner as that according to the first embodiment. In detail, the transparent filler is filled completely in the entire space inside the range finder module without leaving any unfilled region. Moreover, the shield walls 2d exhibit the following effects. In FIG. 4(a), the range finder module employs the U-groove 2c according to the first embodiment, in that any shield wall is not disposed. In FIG. 4(b), the range finder module employs the U-groove 2c according to the second embodiment, in that shield walls are arranged. In FIGS. 4(a) and 4(b), paths of rays from the range finding lens mount 1 and, the large incident angles thereof are described. In FIG. 4(a), a part of the rays, having high incident angles and refracted by the range finding lens 1R, enters the light guide space 2a and enters the other light guide space 2a without being reflected. The other part of the rays, having high incident angles and refracted by the optical lens mount 1, enters the light guide space 2a and reaches the U-groove 2c.

When any shield wall is not disposed, the rays entering the other light guide space 2a through the U-groove 2c are stray rays, that impair the range finding accuracy. When the shield walls 2d are arranged in the U-groove 2c as shown in FIG. 4(b), the rays, that have reached the U-groove 2c, are interrupted by the shield walls 2d and reflected or absorbed by the shield walls 2d. Thus, the shield walls 2d prevent the rays from entering the other light guide space 2a and eliminate the stray light from lowering the accuracy of the range finder.

In FIG. 3(c), one of the shield walls is arranged on one side of the U-groove 2c and the other two shield walls on the other side of the U-groove 2c. In FIG. 3(d), four shield walls 2d are arranged along the U-groove 2c in an inter-digitated fashion.

As described above, the range finder according to the invention includes an optical lens mount including a pair of range finding lenses arranged side by side; an aperture mount including a pair of light guide spaces arranged side by side corresponding to the range finding lenses, a pair of aperture holes for limiting the rays through the range finding lenses arranged side by side corresponding to the range finding lenses, and a partition wall separating the light guide spaces; a sensor stage mounting thereon a semiconductor sensor chip for measuring the distance between an object and the image of the object formed thereon through the range finding lenses; the optical lens mount, the aperture mount and the sensor stage being piled up and combined into a unit such that a module of the range finder is formed; a transparent filler filling the space inside the module of the range finder such that the semiconductor sensor chip is sealed; and the aperture mount including a channel of flow (or U-groove) formed across the partition wall, the channel of flow (or U-groove) connecting the light guide spaces arranged side by side. The channel of flow (or U-groove) includes shield walls arranged therein.

The range finder for auto-focusing having the structure described above exhibits the following effects:

(1) the range finder according to the invention facilitates filling the light guide spaces inside the module of the range finder with a transparent filler completely without leaving any unfilled region, preventing presence of voids due to unfilled regions, and improving the throughput, when the range finder modules are manufactured;

(2) by avoiding unfilled regions, an appropriate amount of the transparent filler is injected into the module of the range finder and poor external appearance caused by the transparent filler that has leaked from the injection port and has stuck to the semiconductor sensor stage and the lead terminal, is prevented from occurring;

(3) since the transparent filler is injected smoothly due to the structure of the range finder according to the invention, the transparent filler is injected fast and, therefore, the period of time necessary to inject the transparent filler is shortened; and (4) the shield walls arranged in the channel of flow (or U-groove) prevent the rays, that have entered the light guide space through the range finding lens, from entering the adjacent light guide space through the channel of flow (or U-groove) without impairing the effects of the channel of flow (or U-groove). In short, the shield walls prevents stray light from lowering the range finding accuracy.

What is claimed is:

1. A range finder comprising:

an optical lens mount including a pair of range finding lenses arranged side by side;

an aperture mount including a pair of light guide spaces, the light guide spaces being arranged side by side corresponding to the range finding lenses, a pair of aperture holes for limiting the rays through the range finding lenses, the aperture holes being arranged side by side corresponding to the range finding lenses, and a partition wall separating the light guide spaces; and a sensor stage mounting including a semiconductor sensor chip thereon, the semiconductor sensor chip measuring the distance between an object and the image of the object formed thereon through the range finding lenses;

wherein the optical lens mount, the aperture mount and the sensor stage being piled up and combined into a unit, whereby to form a module of the range finder;

wherein a transparent filler fills a space inside the module of the range finder to seal the semiconductor sensor chip; and wherein the aperture mount comprises a channel of flow formed across the partition wall, the channel of flow connecting the light guide spaces arranged side by side wherein the channel of flow lies between the aperture holes and the range finding lenses.

2. The range finder according to claim 1, wherein the channel of flow comprises a U-shaped groove formed across the partition wall on the open end side of the aperture mount facing to the range finding lenses.

3. The range finder according to claim 1, the range finder further comprising shield walls arranged in the channel of flow, the shield walls preventing a ray, that has entered the channel of flow through one of the range finding lens, from entering the light guide space on the other side through the channel of flow.

4. The range finder according to claim 3, wherein the shield walls comprises one or more walls protruding from one of the side walls of the channel of flow and one or more walls protruding from the other side wall of the channel of flow in an interdigitated fashion.

5. The range finder according to claim 3, the range finder further comprising a space between the shield walls and the optical lens mount.

* * * * *